US012782748B2

(12) United States Patent
Weng et al.

(10) Patent No.: US 12,782,748 B2
(45) Date of Patent: Nov. 3, 2026

(54) OPTICAL SYSTEM

(71) Applicant: TDK TAIWAN CORP., Taoyuan City (TW)

(72) Inventors: Chih-Wei Weng, Taoyuan City (TW); Shu-Shan Chen, Taoyuan City (TW); Yung-Hsien Yeh, Taoyuan City (TW)

(73) Assignee: ACTUTEK CORPORATION, Taoyuan City (TW)

( * ) Notice: Subject to any disclaimer, the term of this patent is extended or adjusted under 35 U.S.C. 154(b) by 537 days.

(21) Appl. No.: 18/319,646

(22) Filed: May 18, 2023

(65) Prior Publication Data

US 2023/0375848 A1 Nov. 23, 2023

Related U.S. Application Data

(60) Provisional application No. 63/343,720, filed on May 19, 2022.

(51) Int. Cl.
*G02B 27/30* (2006.01)
*G02B 27/01* (2006.01)

(52) U.S. Cl.
CPC .......... *G02B 27/30* (2013.01); *G02B 27/0172* (2013.01)

(58) Field of Classification Search
CPC . G02B 27/30; G02B 27/0172; G02B 27/0101
See application file for complete search history.

(56) References Cited

U.S. PATENT DOCUMENTS

2024/0061249 A1* 2/2024 Curtis ................ G02B 27/0172
2024/0145651 A1* 5/2024 Liu ........................ H10H 29/10

* cited by examiner

*Primary Examiner* — Mariam Qureshi
(74) *Attorney, Agent, or Firm* — MUNCY, GEISSLER, OLDS & LOWE, P.C.

(57) ABSTRACT

An optical system is provided. The optical system includes a light source module and an adjustment assembly. The light source module emits a light source. The light source includes a first light and a second light. The adjustment assembly corresponds to the first light and the second light. The wavelength of the first light and the wavelength of the second light are different.

18 Claims, 12 Drawing Sheets

OPTICAL SYSTEM

CROSS REFERENCE TO RELATED APPLICATIONS

This application claims the benefit of U.S. Provisional Application No. 63/343,720 filed May 19, 2022, the entirety of which is incorporated by reference herein.

BACKGROUND OF THE INVENTION

Field of the Invention

The present invention relates to an optical system, and, in particular, to an optical system with an adjustment assembly.

Description of the Related Art

With the development of technology, many head-mounted displays for displaying images and colors have been developed. In view of the increasing use of head-mounted display devices, it is necessary to develop more stable and better optical quality, in addition to convenient and thinner designs, to provide users with more choices.

BRIEF SUMMARY OF THE INVENTION

The present invention provides an optical system. The optical system includes a light source module and an adjustment assembly. The light source module emits a light source. The light source includes a first light and a second light. The adjustment assembly corresponds to the first light and the second light. The wavelength of the first light and the wavelength of the second light are different.

According to some embodiments of the present disclosure, the adjustment assembly includes a first surface, a second surface, a first adjustment component and a second adjustment component. The first surface and the second surface are parallel to each other, and both have a planar structure. The first surface and the second surface are located on different planes. The first adjustment component disposed on the first surface corresponds to the first light. The first adjustment component has a periodic microstructure. The second adjustment component disposed on the second surface corresponds to the second light. The second adjustment component has a periodic microstructure.

According to some embodiments of the present disclosure, the change in the first light after passing through the first adjustment component is greater than the change in the second light after passing through the first adjustment component.

According to some embodiments of the present disclosure, the maximum change in the angle of the first light after passing through the first adjustment component is greater than the maximum change in the angle of the second light after passing through the first adjustment component.

According to some embodiments of the present disclosure, the change in the first light after passing through the second adjustment component is smaller than the change in the second light after passing through the second adjustment component.

According to some embodiments of the present disclosure, the maximum change in the angle of the first light after passing through the second adjustment component is smaller than the maximum change in the angle of the second light after passing through the second adjustment component.

According to some embodiments of the present disclosure, the adjustment assembly further includes a first substrate, the first surface and the second surface are on both sides of the first substrate, and the first surface and the second surface are facing different directions.

According to some embodiments of the present disclosure, the light source further includes a third light. The adjustment assembly further includes a third surface and a third adjustment component. The third adjustment component has a periodic microstructure. The third adjustment component is disposed on the third surface.

According to some embodiments of the present disclosure, the change in the third light after passing through the third adjustment component is greater than the change in the second light after passing through the third adjustment component.

According to some embodiments of the present disclosure, the maximum change in the angle of the third light after passing through the third adjustment component is greater than the maximum change in the angle of the second light after passing through the third adjustment component.

According to some embodiments of the present disclosure, the first surface and the third surface face the same direction.

According to some embodiments of the present disclosure, the adjustment assembly further includes a second substrate, and the third surface is on the second substrate.

According to some embodiments of the present disclosure, the adjustment assembly includes a first protective layer, a second protective layer, a third protective layer, a first adjustment component, a second adjustment component, a third adjustment component, a first interposer, a second interposer and a third interposer. The first adjustment component is disposed on the first interposer. The second adjustment component is disposed on the second interposer. The third adjustment component is disposed on the third interposer.

According to some embodiments of the present disclosure, the first protective layer is over the first interposer, the second protective layer is over the second interposer, and the third protective layer is over the third interposer, so that the adjustment component is formed in a plurality of processes consecutively.

According to some embodiments of the present disclosure, the optical system further includes a target component, a switching assembly and an optical path diverting component. The switching assembly holds the adjustment assembly, and may switch the adjustment assembly to a first position or a second position. The optical path diverting component changes the deflection angle of the light source after the light source enters the optical path diverting component. The light source sequentially passes through the adjustment assembly and the optical path diverting component, and forms an image on the target component.

According to some embodiments of the present disclosure, the switching assembly drives the adjustment assembly to the first position when the light source module emits the first light.

According to some embodiments of the present disclosure, the switching assembly drives the adjustment component to the second position when the light source module emits the second light.

According to some embodiments of the present disclosure, the adjustment assembly includes a first switching surface and a second switching surface. The first switching surface and the second switching surface are coplanar.

According to some embodiments of the present disclosure, the adjustment assembly further includes a first adjustment component and a second adjustment component. The first adjustment component is disposed on the first switching surface. The second adjustment component is disposed on the second switching surface.

According to some embodiments of the present disclosure, the first adjustment component corresponds to the light source when the adjustment assembly is in the first position. The second adjustment component corresponds to the light source when the adjustment assembly is in the second position.

BRIEF DESCRIPTION OF THE DRAWINGS

The present invention can be clearly understood through the following detailed description and accompanying drawings. It is emphasized that, in accordance with the standard practice in the industry, various features are not drawn to scale and are used for illustration purposes only. In fact, the dimensions of the various features may be arbitrarily expanded or reduced for clarity of illustration.

DETAILED DESCRIPTION OF THE INVENTION

Figure 1A:
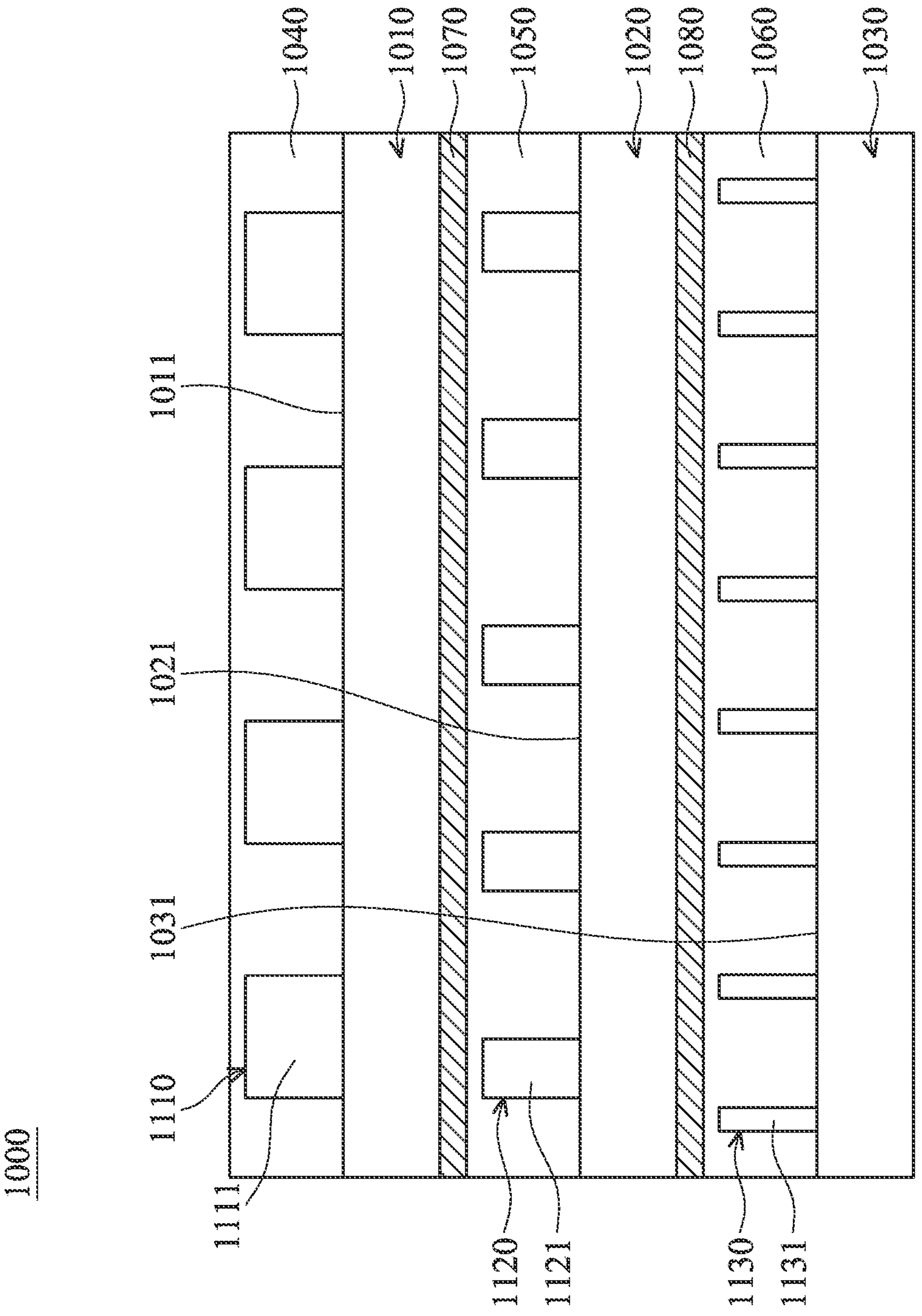
FIG. 1A is a schematic side view of an adjustment assembly according to some embodiments of the present disclosure.

In order to make the purpose, features, and advantages of the present invention more clear and easy to understand, specific embodiments are described below and illustrated in the accompanying drawings. The configuration of each element in the embodiments is for illustrative purposes only and not intended to limit the scope of the present invention. The repetition of the same reference numerals in the figures of the embodiments is for the purpose of simplification and does not imply any relationship between different embodiments. The directional terms used in the following embodiments, such as up, down, left, right, front, or rear, are only for reference to the orientation of the accompanying drawings. Therefore, the directional terms used are for illustrative purposes and not intended to limit the present invention.

In addition, the embodiments may use terms of relativity, such as "lower" or "bottom" and "higher" or "top" to describe the relative relationship between one component of the illustration and another. It should be understood that if the device in the illustration is flipped upside down, the component described as "lower" side will become the component on the "higher" side.

The following describes an optical system of the embodiment of the present invention. However, it is readily understood that the present invention provides many inventive concepts that can be applied to various specific backgrounds. The specific embodiments disclosed herein are only for the purpose of illustrating how to use the present invention in a specific manner and not intended to limit the scope of the present invention. Unless otherwise defined, all terms used herein (including technical and scientific terms) have the same meaning as those commonly understood by those skilled in the art. It should be understood that these terms, as used in a dictionary commonly used by those skilled in the art, should be interpreted as having a meaning consistent with the relevant technology and context of the present invention, and should not be interpreted in an idealized or overly formal manner unless specifically defined herein.

The present invention provides an optical system 100 capable of generating images. In the embodiment shown in FIG. 1A to FIG. 2C, the optical system 100 includes an adjustment assembly 1000 (FIG. 1A), a light source module 2000 (FIG. 2A), an optical path diverting component (not shown) and a target component (not shown). The light source module 2000 emits a light source passing through the adjustment assembly 1000. The light source passes through the adjustment assembly 1000 and the light path diverting component (not shown) in sequence, and then forms an image on the target component. The structure thereof will be described in detail below.

FIG. 1A is a schematic side view of the adjustment assembly 1000 according to some embodiments of the present disclosure. In the embodiment shown in FIG. 1A, the adjustment assembly 1000 includes a first substrate 1010, a second substrate 1020, a third substrate 1030, a plurality of protective layers 1040, 1050, 1060, a plurality of adhesive layers 1070 and 1080, a first adjustment component 1110, a second adjustment component 1120 and a third adjustment component 1130. The first substrate 1010, the second substrate 1020, the third substrate 1030, the protective layers 1040, 1050, 1060, and the adhesive layers 1070 and 1080 are made of transparent materials.

In the embodiment shown in FIG. 1A, the first substrate 1010, the second substrate 1020 and the third substrate 1030 are parallel to each other. The first substrate 1010 includes a first surface 1011. The second substrate 1020 includes a second surface 1021. The third substrate 1030 includes a third surface 1031.

The first surface 1011, the second surface 1021 and the third surface 1031 are parallel to each other and are all planar structures. The first surface 1011, the second surface 1021 and the third surface 1031 are on different planes.

In the embodiment shown in FIG. 1A, the first adjustment component 1110 is disposed on the first surface 1011. The second adjustment component 1120 is disposed on the second surface 1021. The third adjustment component 1130 is disposed on the third surface 1031. The first surface 1011, the second surface 1021 and the third surface 1031 face the same direction. The protective layer 1040 is filled around the first adjustment component 1110 to protect the structure of the first adjustment component 1110. The protective layer 1050 is filled around the second adjustment component 1120 to protect the structure of the second adjustment component 1120. The protective layer 1060 is filled around the third adjustment component 1130 to protect the structure of the third adjustment component 1130. The adhesive layer 1070 is disposed between the first substrate 1010 and the protective layer 1050. The adhesive layer 1080 is disposed between the second substrate 1020 and the protective layer 1060.

Figure 1B:
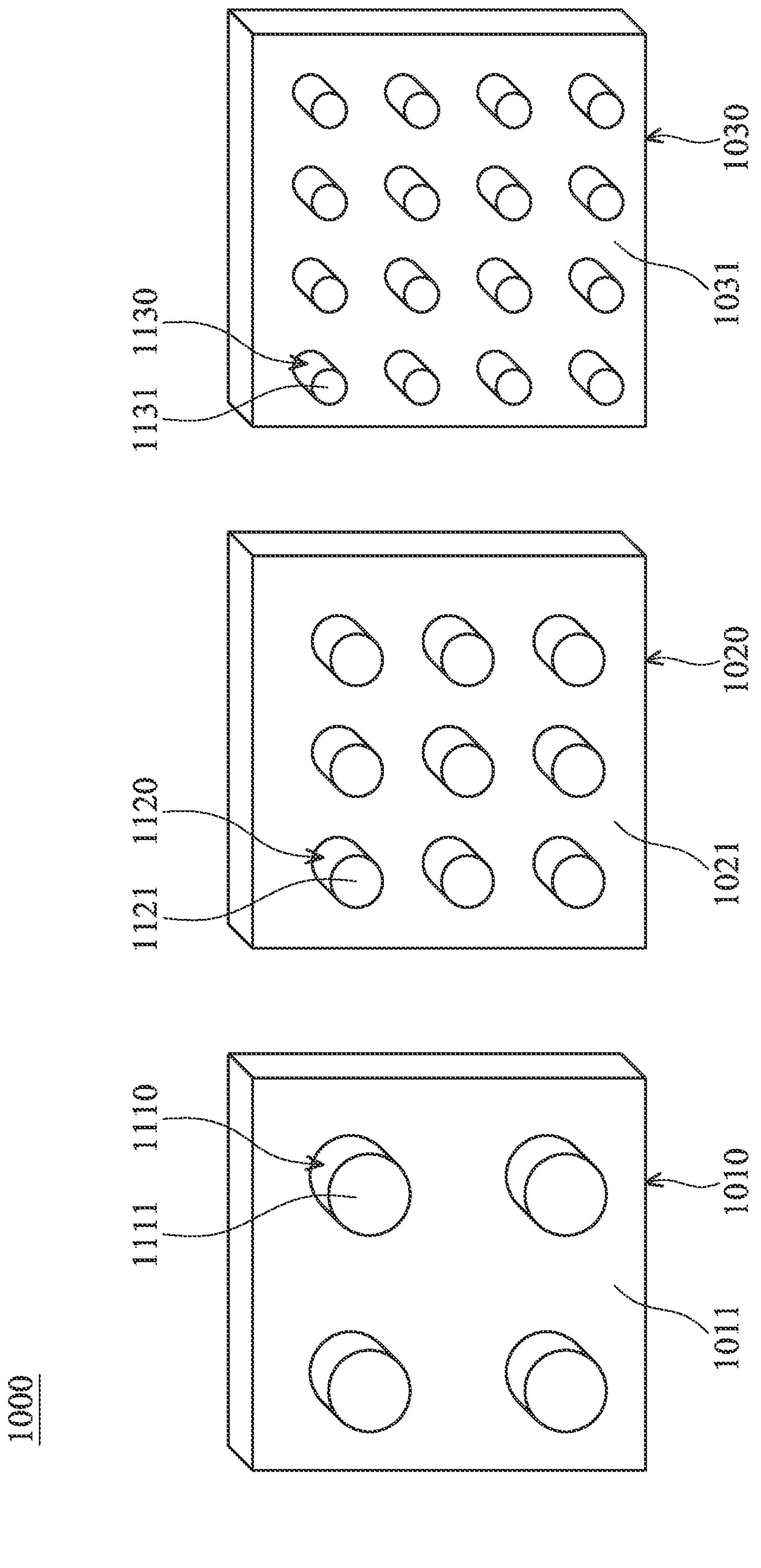
FIG. 1B is a schematic diagram of the adjustment assembly according to some embodiments of the present disclosure, wherein schematic perspective views of a first adjustment component, a second adjustment component and a third adjustment component are shown, respectively.

Next, please refer to FIG. 1A and FIG. 1B together. FIG. 1B is a schematic diagram of the adjustment assembly 1000 according to some embodiments of the present disclosure, wherein a schematic perspective view of the first adjustment component 1110, the second adjustment component 1120 and the third adjustment component 1130 are shown, respectively.

For illustrative purposes, the first substrate 1010, the second substrate 1020, and the third substrate 1030 in FIG. 1B are shown separately, but it should be understood that the embodiment represented in FIG. 1A and FIG. 1B, the first substrate 1010, the second substrate 1020, and the third substrate 1030 are stacked together in the manner shown in FIG. 1A.

The first adjustment component 1110 includes a plurality of first microstructures 1111, for the purpose of brevity and clarity, only one first microstructure 1111 is labeled in FIG. 1A as a representative. It should be understood that the first adjustment component 1110 refers to the plurality of first microstructures 1111 arranged periodically on the first surface 1011.

Similarly, the second adjustment component 1120 includes a plurality of second microstructures 1121 that are arranged periodically. The third adjustment component 1130 includes a plurality of third microstructures 1131 that are arranged periodically. In some embodiments of the present disclosure, the adjustment assembly 1000 having microstructures may be an optical element such as a metalens.

In some embodiments of the present disclosure, the first microstructures 1111, the second microstructures 1121 and the third microstructures 1131 are in cylindrical shape, but the first microstructures 1111, the second microstructures 1121 and the third microstructures 1131 may also be in other shapes (e.g., polygonal pillars, etc.) depending on design requirements.

In some embodiments of the present disclosure, the first microstructures 1111 have the same height as the second microstructures 1121 and the third microstructures 1131. The diameter of the first microstructures 1111 is greater than the diameters of the second microstructures 1121 and the third microstructures 1131. The diameter of the second microstructures 1121 is larger than the diameter of the third microstructures 1131.

It is noted that the plurality of first microstructures 1111, the plurality of second microstructures 1121 and the plurality of third microstructures 1131 may be arranged differently from the arrangement shown in FIG. 1B, and the arrangement depends on design requirements.

Figure 2A:
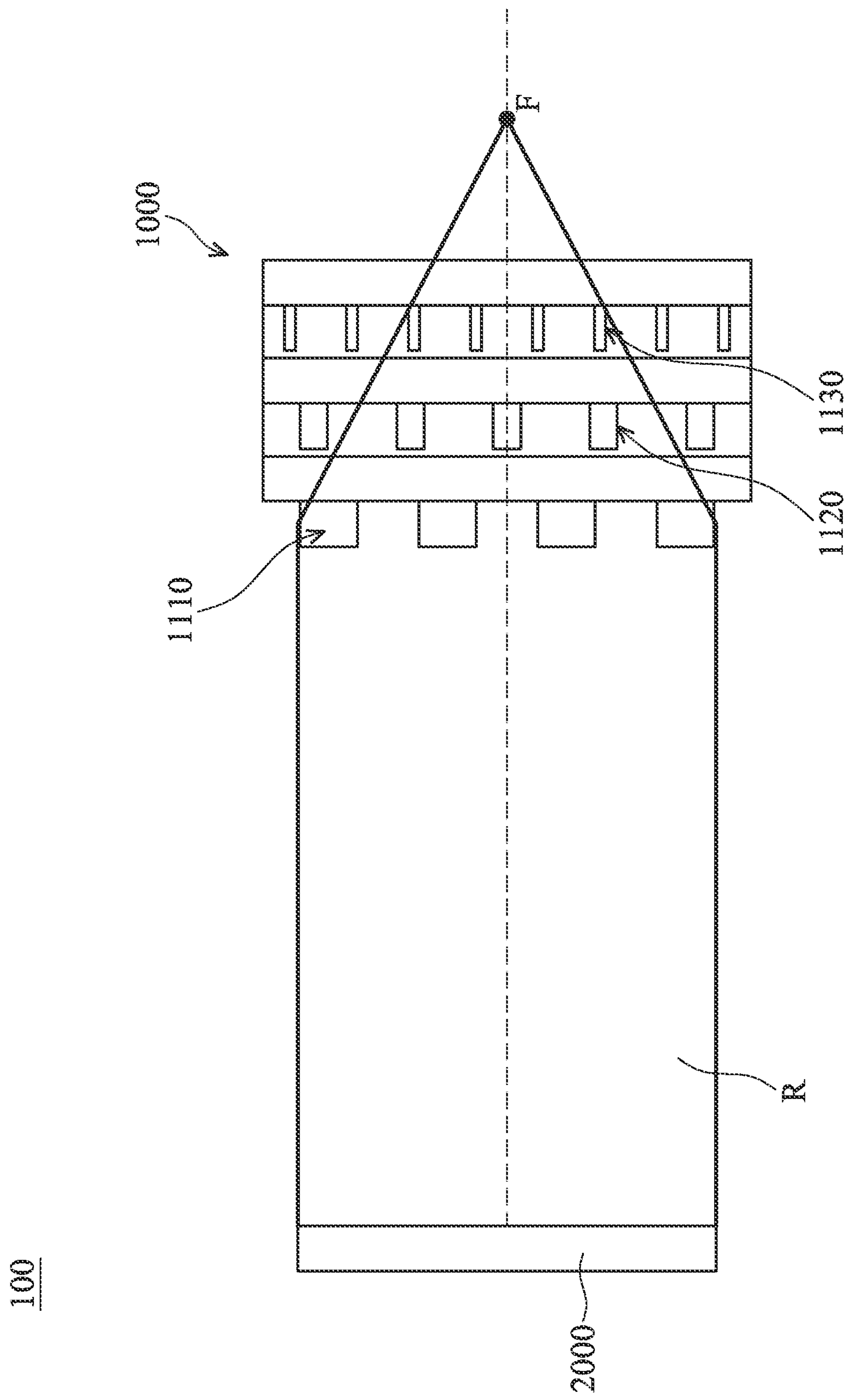
FIG. 2A, FIG. 2B and FIG. 2C show the schematic diagrams of the adjustment assembly and a light source module of an optical system.
Figure 2B:
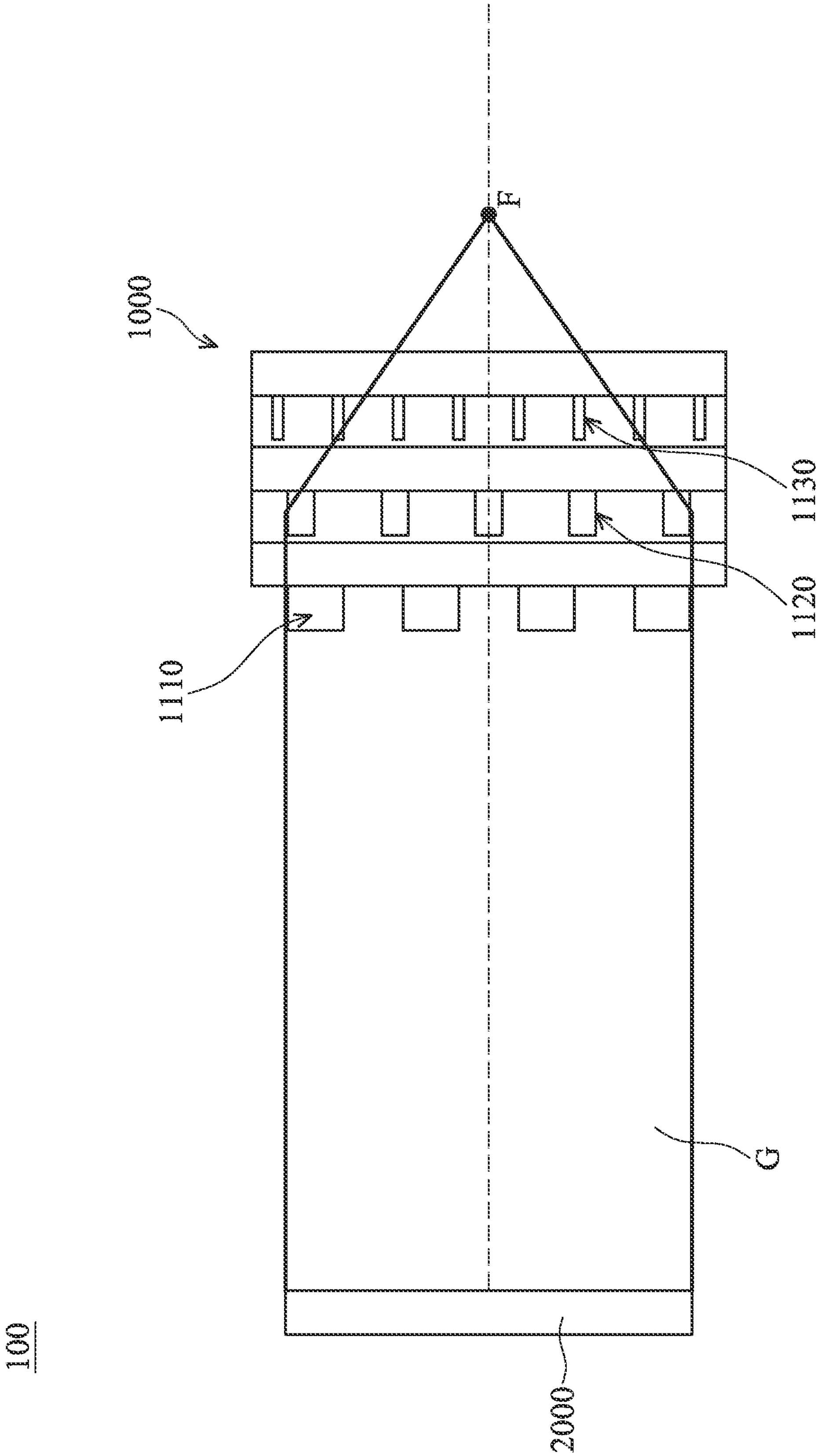
Figure 2C:
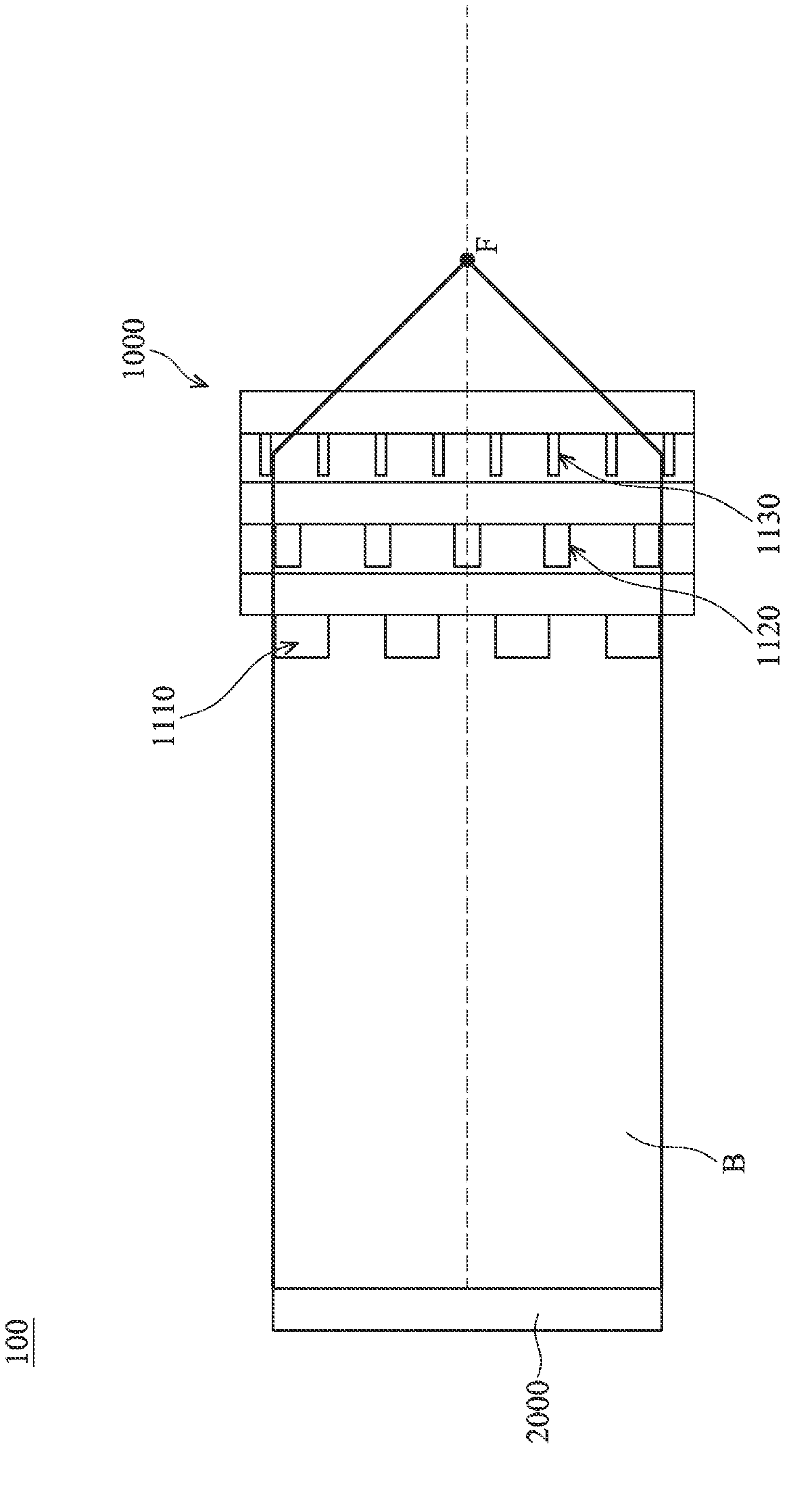

FIG. 2A, FIG. 2B and FIG. 2C show schematic diagrams of the adjustment assembly 1000 and the light source module 2000 of the optical system 100. The adjustment assembly 1000 corresponds to the light source emitted by the light source module 2000. This light source may include a first light R (for example, red (R) among the three primary colors), a second light G (for example, green (G) among the three primary colors) and a third light B (for example, blue (B) among the three primary colors). The wavelength of the first light R, the wavelength of the second light G and the wavelength of the third light B are all different.

It should be understood that, in the embodiments shown in FIG. 2A, FIG. 2B and FIG. 2C, the light source module 2000 may project all-band light (for example, simultaneously emitting the first light R, the second light G, and the third light B), but for the purpose of illustration, what FIG. 2A shows is a schematic diagram of the light source module 2000 emitting the first light R alone, and FIG. 2B shows a schematic diagram of the light source module 2000 emitting the second light G alone, and FIG. 2C shows a schematic diagram of the light source module 2000 emitting the third light B alone. Alternatively, in some embodiments, the light source module 2000 may also emit the first light R, the second light G and the third light B cyclically. It is noted that after the first light R (FIG. 2A), the second light G (FIG. 2B) and the third light B (FIG. 2C) pass through the adjustment assembly 1000, they will all focus on the same focal point F, whereby the color image is imaged at the focal point F.

As shown in FIG. 2A, the first adjustment component 1110 corresponds to the first light R emitted by the light source module 2000. In particular, the change in the first light R after passing through the first adjustment component 1110 (FIG. 2A) is greater than the change in the second light G after passing through the first adjustment component 1110 (FIG. 2B). The change mentioned here may refer to, for example, the refractive index. The maximum change in the angle of the first light R after passing through the first adjustment component 1110 is greater than the maximum change in the angle of the second light G after passing through the first adjustment component 1110.

In addition, the change in the first light R after passing through the second adjustment component 1120 is smaller than the change in the second light G after passing through the second adjustment component 1120. In other words, the maximum change in the angle of the first light R after passing through the second adjustment component 1120 (FIG. 2A) is smaller than the maximum change in the angle of the second light G after passing through the second adjustment component 1120 (FIG. 2B).

Similarly, the change in the first light R after passing through the third adjustment component 1130 (FIG. 2A) is smaller than the change in the third light B after passing through the third adjustment component 1130 (FIG. 2C). In other words, the maximum change in the angle of the first light R after passing through the third adjustment component 1130 is smaller than the maximum change in the angle of the third light B after passing through the third adjustment component 1130.

As shown in FIG. 2B, the second adjustment component 1120 corresponds to the second light G emitted by the light source module 2000. In particular, the change in the second light G after passing through the second adjustment component 1120 (FIG. 2B) is greater than the change in the first light R after passing through the second adjustment component 1120 (FIG. 2A). In other words, the maximum change in the angle of the second light G after passing through the second adjustment component 1120 is greater than the maximum change in the angle of the first light R after passing through the second adjustment component 1120.

In addition, the change in the second light G after passing through the third adjustment component 1130 (FIG. 2B) is smaller than the change in the third light B after passing through the third adjustment component 1130 (FIG. 2C). In other words, the maximum change in the angle of the second light G after passing through the third adjustment component 1130 (FIG. 2B) is smaller than the maximum change in the angle of the third light B after passing through the third adjustment component 1130 (FIG. 2C).

As shown in FIG. 2C, the third adjustment component 1130 corresponds to the third light B emitted by the light source module 2000. In particular, the change in the third light B after passing through the third adjustment component 1130 (FIG. 2C) is greater than the change in the first light R after passing through the third adjustment component 1130 (FIG. 2A). In other words, the maximum change in the angle of the third light B after passing through the third adjustment component 1130 is greater than the maximum change in the angle of the first light R after passing through the third adjustment component 1130.

In addition, the change in the third light B after passing through the first adjustment component 1110 (FIG. 2C) is smaller than the change in the first light R after passing through the first adjustment component 1110 (FIG. 2A). In other words, the maximum change in the angle of the third light B after passing through the first adjustment component 1110 (FIG. 2C) is smaller than the maximum change in the angle of the first light R after passing through the first adjustment component 1110 (FIG. 2A).

Similarly, the change in the third light B after passing through the third adjustment component 1130 (FIG. 2C) is greater than the change in the second light G after passing through the third adjustment component 1130 (FIG. 2B). In other words, the maximum change in the angle of the third light B after passing through the third adjustment component 1130 is greater than the maximum change in the angle of the second light G after passing through the third adjustment component 1130.

To sum up, when the light source module 2000 emits the light source including the first light R, the second light G and the third light B, the light source passes through the first adjustment component 1110, the second adjustment component 1120 and the third adjustment component 1130 and imaged at the other end of the adjustment assembly 1000. It should be understood that the composition of the first light R, the second light G and the third light B in the light source is determined depending on the image color requirements.

The adjustment assembly 1000 shown in FIG. 1A to FIG. 2C has a first adjustment component 1110, a second adjustment component 1120 and a third adjustment component 1130 in stacks arrangement. In this configuration, the light source module 2000 with all-band light source projection may be used, so as to achieve better imaging effects (for example, no time difference caused by switching light) and the effect of miniaturization of the mechanism.

Figure 3B:
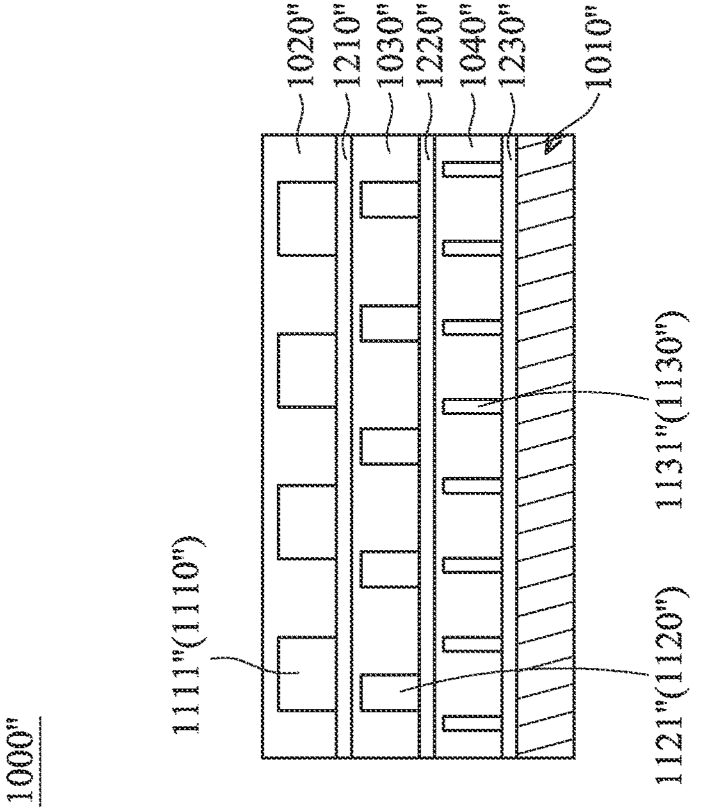
FIG. 3B shows a schematic side view of an adjustment assembly according to yet another embodiment of the present disclosure.
Figure 3A:
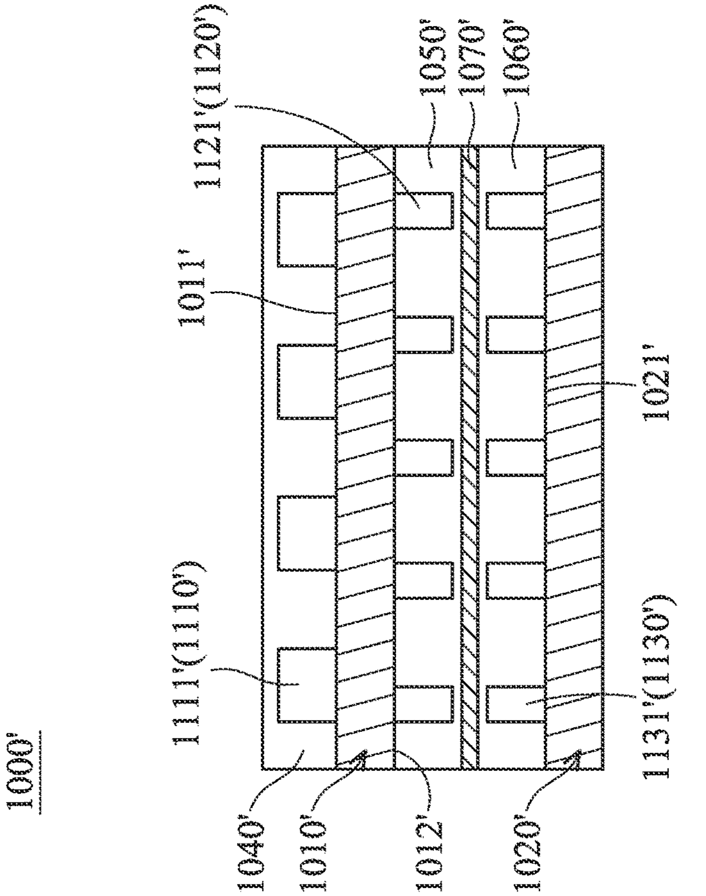
FIG. 3A shows a schematic side view of an adjustment assembly according to another embodiment of the present disclosure.

FIG. 3A shows a schematic side view of an adjustment assembly 1000' according to another embodiment of the present disclosure. In the embodiment shown in FIG. 3A, the adjustment assembly 1000' includes a first substrate 1010', a second substrate 1020', a plurality of protective layers 1040', 1050', 1060', an adhesive layer 1070', a first adjustment component 1110', a second adjustment component 1120' and a third adjustment component 1130'.

In the embodiment shown in FIG. 3A, the first substrate 1010' and the second substrate 1020' are parallel to each other. The first substrate 1010' includes a first surface 1011' and a second surface 1012'. The second substrate 1020' includes a third surface 1021'.

The first surface 1011', the second surface 1012', and the third surface 1021' are parallel to each other, and all have a planar structure. The first surface 1011' and the second surface 1012' are on both sides of the first substrate 1010'. The first surface 1011' and the second surface 1012' face opposite directions.

In the embodiment shown in FIG. 3A, the first adjustment component 1110' is disposed on the first surface 1011'. The second adjustment component 1120' is disposed on the second surface 1012'. The third adjustment component 1130' is disposed on the third surface 1021'. The first surface 1011' and the third surface 1021' face the same direction. The adhesive layer 1070' is disposed between the protective layer 1050' and the protective layer 1060', for bonding the protective layer 1050' and the protective layer 1060'.

The embodiment shown in FIG. 3A is similar to the embodiment shown in FIG. 1A in that the first adjustment component 1110' also includes a plurality of first microstructures 1111'. The second adjustment component 1120' also includes a plurality of second microstructures 1121'. The third adjustment component 1130' also includes a plurality of third microstructures 1131'.

The first adjustment component 1110', the second adjustment component 1120' and the third adjustment component 1130' shown in FIG. 3A have similar appearance and characteristics to the first adjustment component 1110, the second adjustment component 1120 and the third adjustment component 1130, therefore the details of which are not repeated here.

FIG. 3B shows a schematic side view of an adjustment assembly 1000" according to yet another embodiment of the present disclosure. In the embodiment shown in FIG. 3B, the adjustment assembly 1000" includes a first substrate 1010", a first protective layer 1020", a second protective layer 1030", a third protective layer 1040", a first adjustment component 1110", a second adjustment component 1120", a third adjustment component 1130", a first interposer 1210", a second interposer 1220" and a third interposer 1230".

In the embodiment shown in FIG. 3B, the first adjustment component 1110" is disposed on the first interposer 1210". The second adjustment component 1120" is disposed on the second interposer 1220". The third adjustment component 1130" is disposed on the third interposer 1230". The third interposer 1230" is disposed on the first substrate 1010". The first protective layer 1020" is filled around the first adjustment component 1110" to protect the structure of the first adjustment component 1110". The second protective layer 1030" is filled around the second adjustment component 1120" to protect the structure of the second adjustment component 1120". The third protective layer 1040" is filled around the third adjustment component 1130" to protect the structure of the third adjustment component 1130".

The first interposer 1210", the second interposer 1220" and the third interposer 1230" are made of polymer, and the third protective layer 1040" is over the third interposer 1230", the second interposer 1220" is over the third protective layer 1040", and the second protective layer 1030" is over the second interposer 1220", the first interposer 1210" is over the second protective layer 1030", and the first protective layer 1020" is over the first interposer 1210". In other words, each interposer, each adjustment component, and each protective layer may be formed in a plurality of processes consecutively without the need for additional adhesive layers filled therein.

The embodiment shown in FIG. 3B is similar to the embodiment in FIG. 1A in that the first adjustment component 1110" includes a plurality of first microstructures 1111". The second adjustment component 1120" includes a plurality of second microstructures 1121". The third adjustment component 1130" includes a plurality of third microstructures 1131".

The first adjustment component 1110", the second adjustment component 1120" and the third adjustment component 1130" shown in FIG. 3B have similar appearance and characteristics to the first adjustment component 1110, the second adjustment component 1120 and the third adjustment component 1130, therefore the details of which are not repeated here.

The adjustment assembly 1000' and the adjustment assembly 1000" shown in FIG. 3A and FIG. 3B provide components with arrangements different from the adjustment assembly 1000. Both the adjustment assemblies 1000' and 1000" may be equipped with the light source module 2000 that uses an all-band light source similar to the aforementioned adjustment assembly 1000, so as to achieve better imaging effects (for example, no time difference caused by switching the light).

In the embodiment shown in FIG. 4A to FIG. 6, the optical system 100A includes an adjustment assembly 1000A, a light source module 2000A, a switching assembly 3000A, an optical path diverting component 4000A and a target component 5000A. The light source module 2000A emits a light source passing through the adjustment assembly 1000A. The light source is imaged on the target component 5000A after passing through the adjustment assembly 1000A and the optical path diverting component 4000A in sequence. The structure thereof is described in detail below.

Figure 4A:
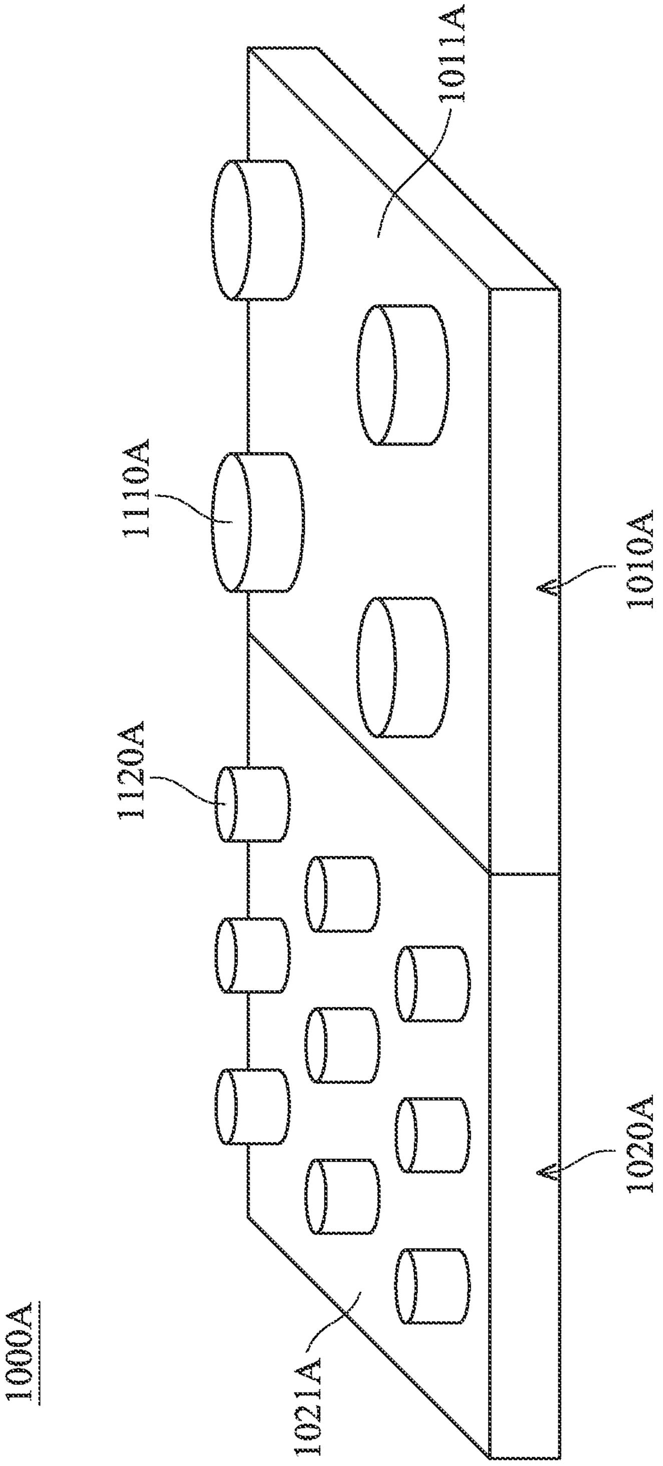
FIG. 4A shows a schematic diagram of an adjustment assembly according to yet another embodiment of the present disclosure.

FIG. 4A shows a schematic diagram of the adjustment assembly 1000A according to yet another embodiment of the present disclosure. The adjustment assembly 1000A includes a first switching portion 1010A, a second switching portion 1020A, a first adjustment component 1110A and a second adjustment component 1120A. The first switching portion 1010A includes a first switching surface 1011A. The second switching portion 1020A includes a second switching surface 1021A. The first adjustment component 1110A is disposed on the first switching surface 1011A. The second adjustment component 1120A is disposed on the second switching surface 1021A.

The difference between the adjustment assembly 1000A and the aforementioned adjustment assembly 1000 (FIG. 1A) is that the first switching portion 1010A and the second switching portion 1020A of the adjustment assembly 1000A may share a substrate. Therefore, the first switching portion 1010A and the second switching portion 1020A are arranged side by side, and the first switching surface 1011A of the first switching portion 1010A and the second switching surface 1021A of the second switching portion 1020A are coplanar.

The first adjustment component 1110A and the second adjustment component 1120A shown in FIG. 4A have similar appearance and characteristics to the first adjustment component 1110 and the second adjustment component 1120 of the previous embodiment. For example, the height of the first adjustment component 1110A is the same as the height of the second adjustment component 1120A. The diameter of the first adjustment component 1110A is larger than the diameter of the second adjustment component 1120A. The first adjustment component 1110A corresponds to the first light R. The second adjustment component 1120A corresponds to the second light G. Therefore, the details of which are not repeated here.

Figure 4B:
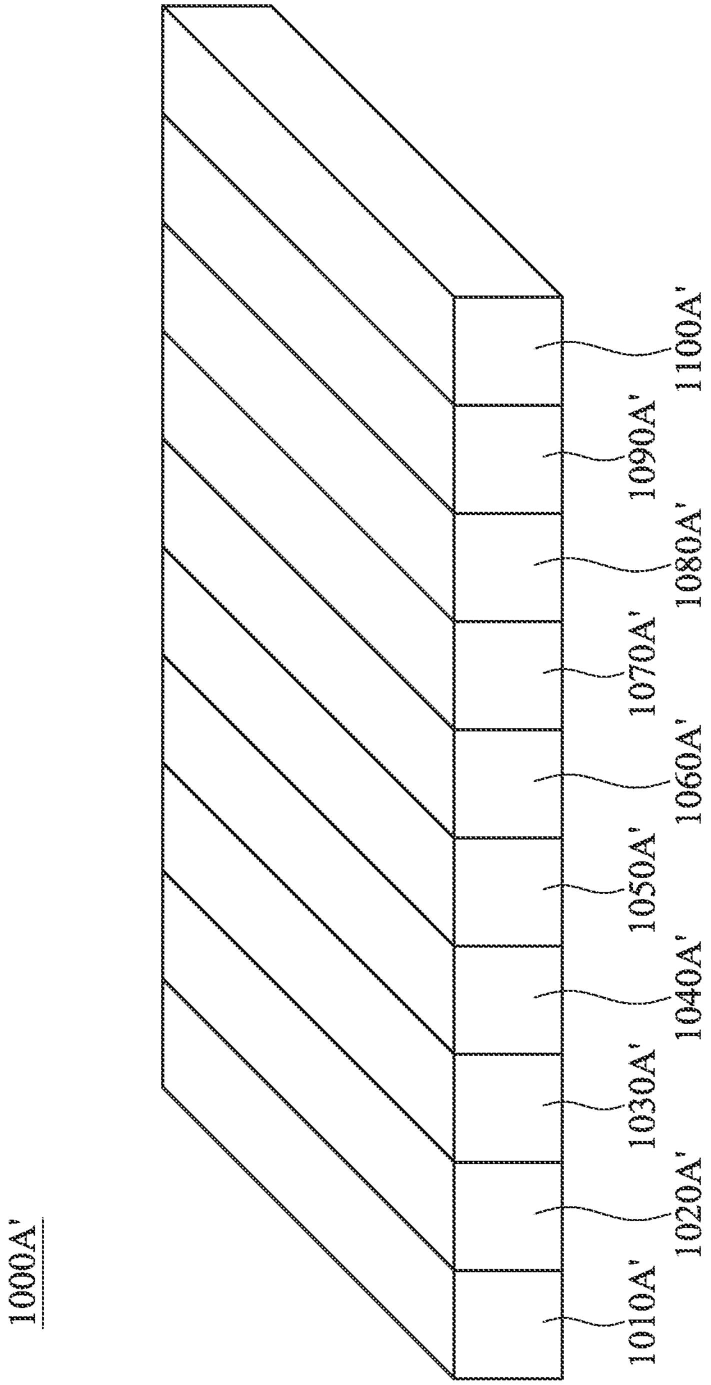
FIG. 4B shows a schematic diagram of an adjustment assembly according to yet another embodiment of the present disclosure.

FIG. 4B shows a schematic diagram of an adjustment assembly 1000A' according to yet another embodiment of the present disclosure. It is noted that the adjustment assembly 1000A' is in the shape of rectangular. The adjustment assembly 1000A' is different from the aforementioned adjustment assembly 1000A in that aside from including a first switching portion 1010A' and a second switching portion 1020A', the adjustment assembly 1000A' further includes a third switching portion 1030A', a fourth switching portion 1040A', a fifth switching portion 1050A', a sixth switching portion 1060A', a seventh switching portion 1070A', an eighth switching portion 1080A', a ninth switching portion 1090A', and a tenth switching portion 1100A'.

For the purpose of brevity, the adjustment components disposed on the adjustment assembly 1000A' are not shown in FIG. 4B. It should be understood that corresponding adjustment components are disposed respectively on the first switching portion 1010A' to the tenth switching portion 1100A'. The adjustment components on the first switching portion 1010A' to the tenth switching portion 1100A' are microstructures with different sizes, and the microstructures correspond to light of different wavelengths.

For example, the first switching portion 1010A' is provided with a first adjustment component, and the appearance and characteristics of which are similar to the first adjustment component 1110A shown in FIG. 4A. The second switching portion 1020A' is provided with a second adjustment component, and the appearance and characteristics of which are similar to the second adjustment component 1120A shown in FIG. 4A. Similarly, the third switching portion 1030A' to the tenth switching portion 1100A' also have corresponding adjustment components.

Figure 5:
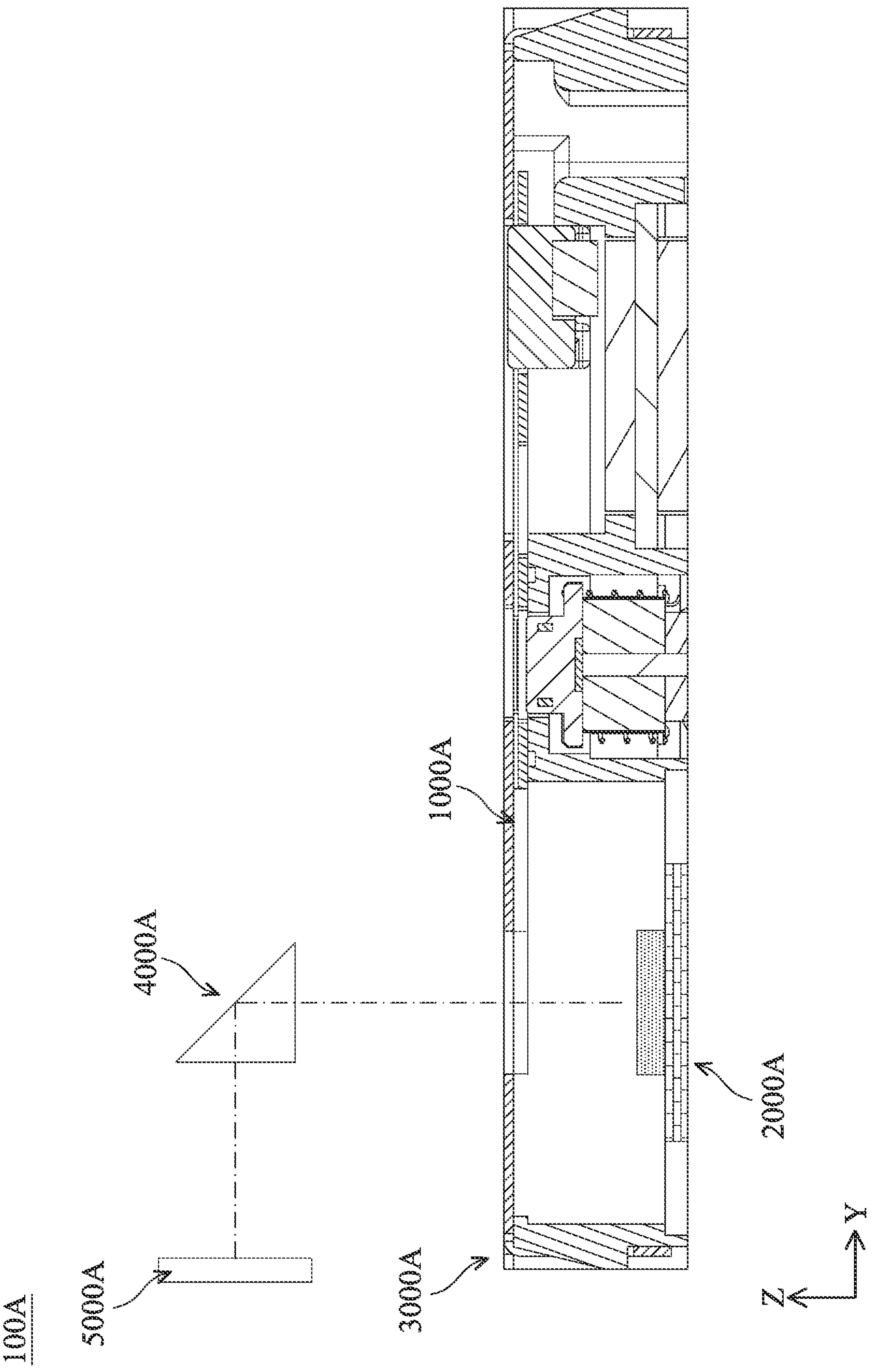
FIG. 5 shows an adjustment component, a light source module, a switching assembly, an optical path diverting component and a target component according to some embodiments of the present disclosure.

FIG. 5 shows a schematic diagram of the adjustment assembly 1000A, the light source module 2000A, the switching assembly 3000A, the optical path diverting component 4000A, and the target component 5000A according to some embodiments of the present disclosure. The light source emitted by the light source module 2000A sequentially passes through the adjustment assembly 1000A, the optical path diverting component 4000A and the target component 5000A.

In the embodiment shown in FIG. 5, the light source module 2000A is different from the aforementioned light source module 2000 (for example, the light source module 2000 shown in FIG. 2A to FIG. 2C) in that the light source module 2000A sequentially switches the light (for example, first light, second light, etc.), to obtaining a color image formed on the target element 5000A.

The switching assembly 3000A holds the adjustment assembly 1000A. The switching assembly 3000A may switch the adjustment assembly 1000A to a first position or a second position. The light path diverting component 4000A may be an component having a function similar to that of a prism, which changes the output angle of the light source entering the light path diverting component 4000A. For example, the direction of the light source is changed from the Z direction to the –Y direction.

When the light source module 2000A emits the first light, the switching assembly 3000A drives the adjustment assembly 1000A to the first position, so that the first light passes through the first adjustment component 1110A (FIG. 4A) of the adjustment assembly 1000A. When the light source module 2000A emits the second light, the switching assembly 3000A drives the adjustment assembly 1000A to the second position, so that the second light passes through the second adjustment component 1120A (FIG. 4A) of the adjustment assembly 1000A.

That is to say, when the adjustment assembly 1000A is in the first position, the first adjustment component 1110A corresponds to the first light of the light source. When the adjustment assembly 1000A is in the second position, the second adjustment component 1120A corresponds to the second light of the light source. The structure of the switching assembly 3000A is described in detail below.

Figure 6:
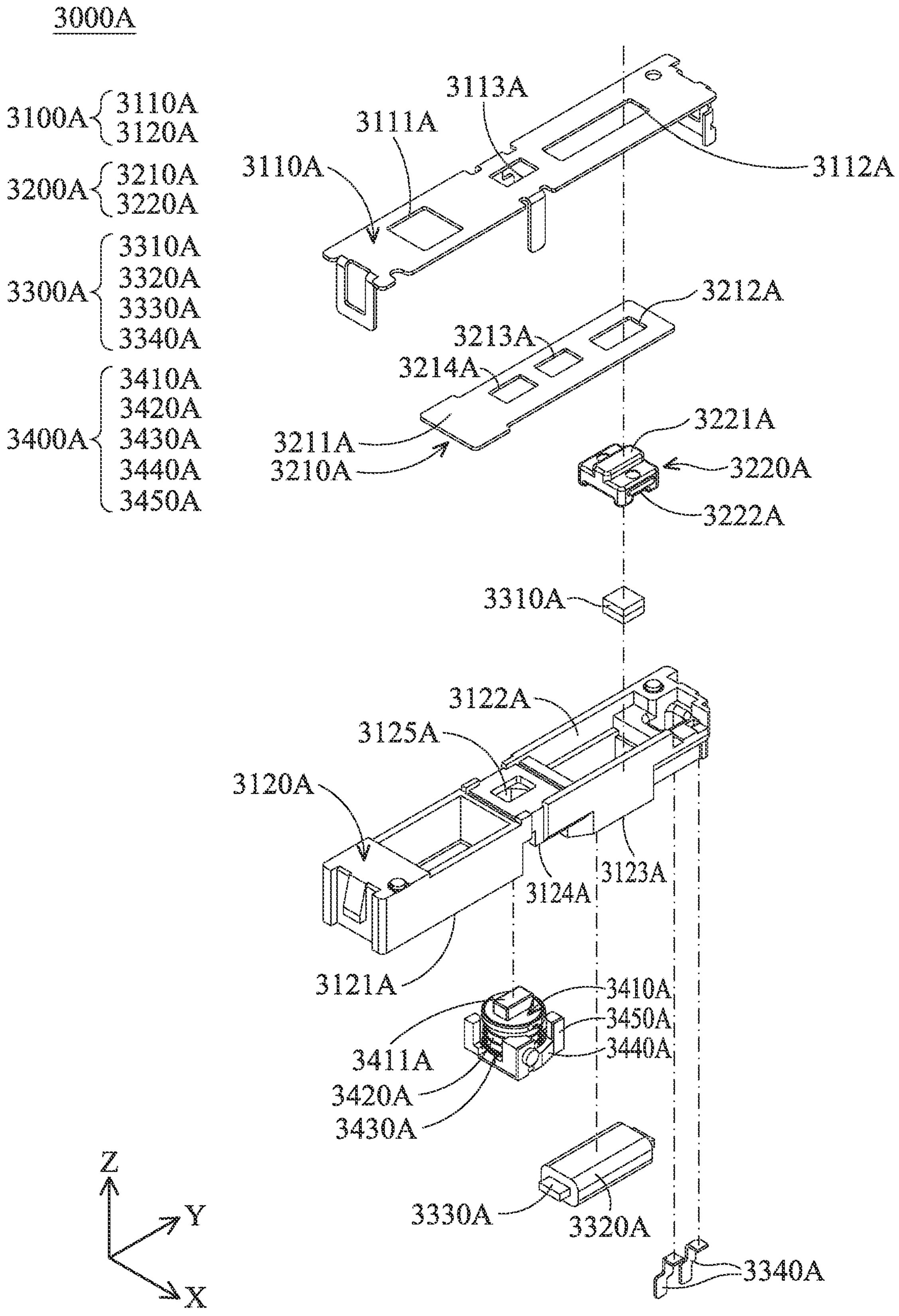
FIG. 6 is an exploded view of the switching assembly according to some embodiments of the present disclosure.

FIG. 6 is an exploded view of a switching assembly 3000A according to some embodiments of the present disclosure. The switching assembly 3000A includes a fixed portion 3100A, a movable portion 3200A, a driving assembly 3300A and a locking assembly 3400A.

In some embodiments, the fixed portion 3100A includes a housing 3110A and a base 3120A. The housing 3110A is fixedly connected to the base 3120A to form an accommodating space for accommodating other components of switching assembly 3000A.

In some embodiments, the housing 3110A includes an opening 3111A, an opening 3112A, and an opening 3113A, details of which is described in detail later. The base 3120A includes an accommodating space 3121A, an accommodating space 3122A, an accommodating space 3123A, an accommodating space 3124A and an opening 3125A.

The accommodating space 3121A of the base 3120A accommodates the light source module 2000A (FIG. 5). The accommodating space 3122A and the accommodating space 3123A of the base 3120A accommodate the driving assembly 3300A. The accommodating space 3124A of the base 3120A accommodates the locking assembly 3400A.

In some embodiments, the movable portion 3200A is movable relative to the fixed portion 3100A. The movable portion 3200A includes a holder 3210A and a movable component 3220A. The movable component 3220A drives the holder 3210A to move relative to the fixed portion 3100A.

The movable component 3220A is disposed in the accommodating space 3122A of the base 3120A, and is movable relative to the fixed portion 3100A in the accommodating space 3122A. The holder 3210A includes a holding portion 3211A, an opening 3212A, an opening 3213A and an opening 3214A. The movable component 3220A includes a protrusion 3221A and an accommodating space 3222A.

In some embodiments, the holding portion 3211A of the holder 3210A holds the adjustment assembly 1000A (FIG. 5). The protrusion 3221A of the movable component 3220A passes through the opening 3212A of the holder 3210A to be fixedly connected to the holder 3210A. The protrusion 3221A of the movable component 3220A also passes through the opening 3112A of the housing 3110A, and is movable in the opening 3112A relative to the fixed portion 3100A.

In some embodiments, the driving assembly 3300A is configured to drive the movable portion 3200A to move relative to the fixed portion 3100A. The driving assembly 3300A includes a magnetic component 3310A, a coil 3320A, a magnetically permeable component 3330A and a set of terminals 3340A.

In some embodiments, the magnetic component 3310A of the driving assembly 3300A is disposed within the accommodating space 3222A of the movable component 3220A. The magnetic component 3310A corresponds to the coil 3320A and the magnetically permeable component 3330A. The terminals 3340A are electrically connected to the coil 3320 and an external circuit (not shown).

When a driving signal is applied to the driving assembly 3300A (such as applying current by an external power supply), a magnetic force is generated between the magnetic component 3310A and the coil 3320A, thereby driving the movable portion 3200A to move between the first position and the second position relative to the fixed portion 3100A.

In some embodiments, the locking assembly 3400A is disposed in the accommodating space 3124A of the base 3120A. The locking assembly 3400A includes a magnetic component 3410A, a coil 3420A, a spring 3430A, a base 3440A and a terminal 3450A.

In some embodiments, the magnetic component 3410A corresponds to the coil 3420A. The magnetic component 3410A is movably connected to the base 3440A via the spring 3430A. The coil 3420A is disposed on the base 3440A. The spring 3430A surrounds the coil 3420A. The terminal 3450A is disposed on the base 3440A. The coil 3420A is electrically connected to an external circuit (not shown) via the terminal.

In some embodiments, when a driving signal is applied to the locking assembly 3400A (such as applying current by an external power supply), a magnetic force is generated between the magnetic component 3410A and the coil 3420A, thereby driving the magnetic component 3410A to moves between a locked position and an unlocked position relative to the fixed portion 3100A.

The magnetic component 3410A of the locking assembly 3400A includes a protrusion 3411A. The protrusion 3411A passes through the opening 3125A of the base 3120A. When the movable portion 3200A moves to the first position, the protrusion 3411A of the magnetic component 3410A of the locking assembly 3400A may pass through the opening 3213A of the holder 3210A to lock the movable portion 3200A in the locked position.

When the movable portion 3200A moves to the second position, the protrusion 3411A of the magnetic component 3410A of the locking assembly 3400A may pass through the opening 3214A of the holder 3210A to lock the movable portion 3200A in the locked position. It is noted that the switching assembly 3000A is provided as an example only, the switching assembly 3000A is configured to drive the adjustment assembly 1000A. Those skilled in the art will easily understand that for different types of adjustment assemblies (for example, the adjustment assembly 1000A'), the details of the switching component 3000A may be changed or replaced according to design requirements. For example, the switching assembly may drive the adjustment assembly to different positions through the driving assembly and various control methods without having a locking assembly.

The embodiments shown in FIG. 4A to FIG. 6 provide the adjustment assembly 1000A for imaging and the switching assembly 3000A for switching the adjustment assembly 1000A. In this embodiment, the adjustment assembly 1000A is assembled on the switching assembly 3000A to achieve the desired optical effect.

Figure 7:
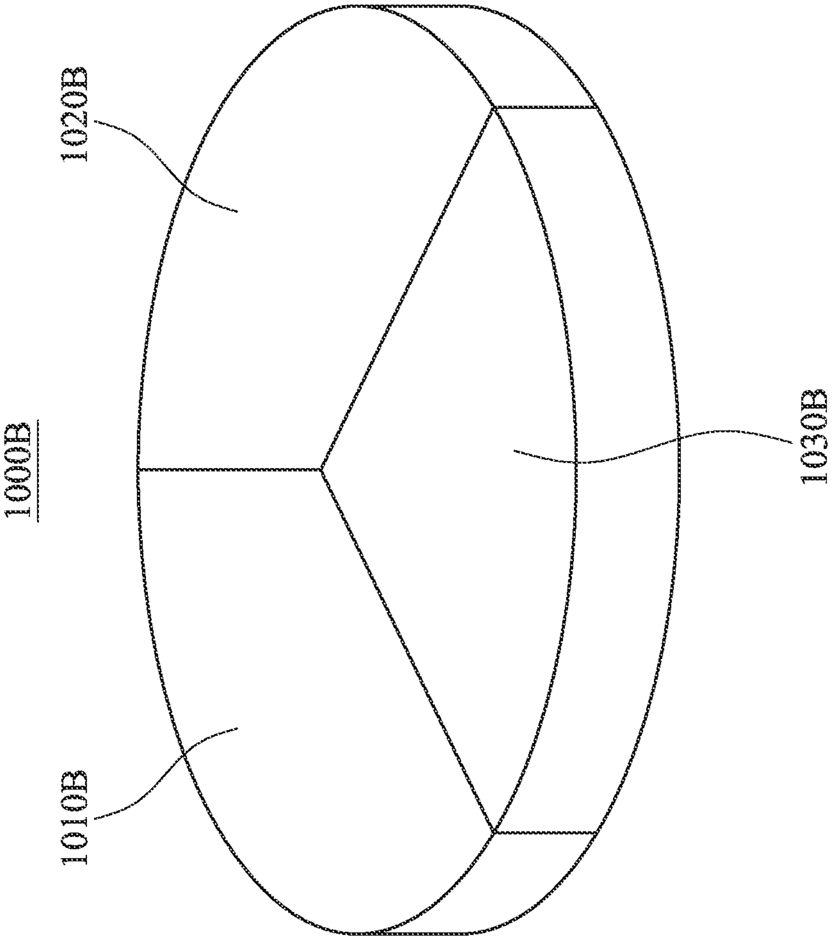
FIG. 7 shows a schematic diagram of an adjustment assembly according to yet another embodiment of the present disclosure.
Figure 8:
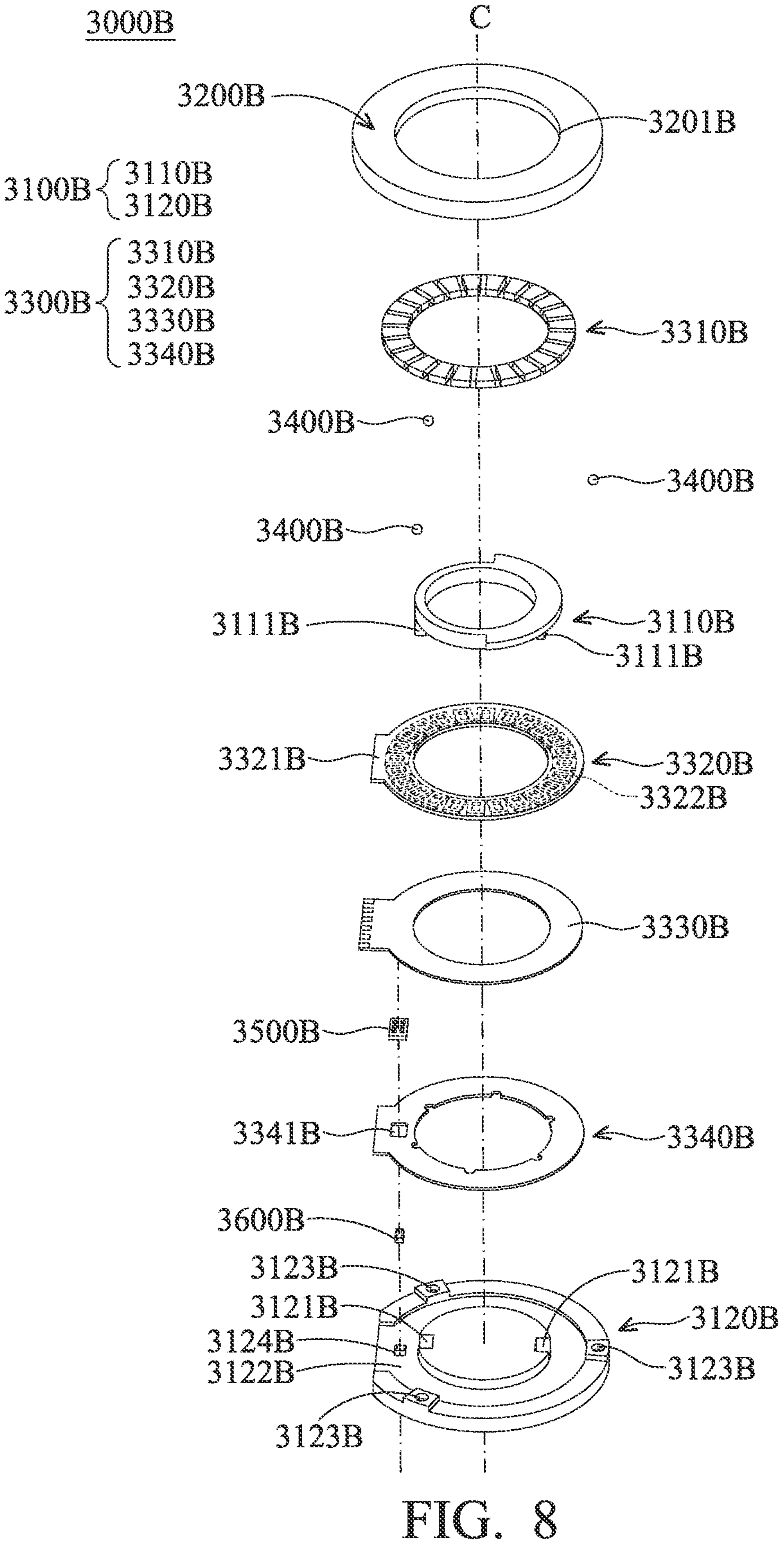
FIG. 8 is an exploded view of the switching assembly for holding the adjustment assembly according to some embodiments of the present disclosure.

In the embodiments shown in FIG. 7 to FIG. 8, the optical system includes an adjustment assembly 1000B, a switching assembly 3000B, a light source module (not shown), an optical path diverting component (not shown) and a target component (not shown). The light source module emits a light source passing through the adjustment assembly 1000B. The light source sequentially passes through the adjustment assembly 1000B and the optical path diverting component (not shown) and then forms an image on the target component (not shown). Since the light source module, the light path diverting component and the target component used in this embodiment are similar to the light source module 2000A, the light path diverting component 4000A and the target component 5000A shown in FIG. 5, therefore the details of which are not repeated here. The adjustment component 1000B and the switching assembly 3000B are described in detail below.

FIG. 7 shows a schematic diagram of the adjustment assembly 1000B according to some embodiments of the present disclosure. The adjustment assembly 1000B includes a first switching portion 1010B, a second switching portion 1020B and a third switching portion 1030B. It is noted that the adjustment assembly 1000B is in the shape of a disc.

Since the adjustment components disposed on the adjustment assembly 1000B are similar to the first adjustment component 1110A or the second adjustment component 1120A shown in FIG. 4A, the adjustment components disposed on the adjustment assembly 1000B are omitted in FIG. 7 for the sake of brevity. It should be understood that, although not shown, corresponding adjustment components are respectively disposed on the first switching portion 1010B to the third switching portion 1030B. The adjustment components on the first switching portion 1010B to the third switching portion 1030B are microstructures with different sizes, and are respectively used to correspond to light of different wavelengths.

In other words, the appearance and characteristics of the adjustment components on the first switching portion 1010B to the third switching portion 1030B are similar to the first adjustment component 1110, the second adjustment component 1120 and the third adjustment component 1130 in FIG. 2A to FIG. 2C. The details of which are described in detail in relation to FIG. 2A to FIG. 2C, therefore the details of which are not repeated here.

The difference between the adjustment assembly 1000B and the aforementioned adjustment assembly 1000 (FIG. 1A) is that the first switching portion 1010B, the second switching portion 1020B and the third switching portion 1030B of the adjustment assembly 1000B may share a substrate. In other words, the first switching portion 1010B, the second switching portion 1020B and the third switching portion 1030B are coplanar.

FIG. 8 is an exploded view of the switching assembly 3000B for holding the adjustment assembly 1000B (FIG. 7) according to some embodiments of the present disclosure. The switching assembly 3000B includes a fixed portion 3100B, a movable portion 3200B, a driving assembly 3300B, a supporting component 3400B, a control component 3500B and a position sensing component 3600B.

In some embodiments, the fixed portion 3100B includes a holding portion 3110B and a base 3120B. The holding portion 3110B holds a blocking component (not shown). The holding portion 3110B is fixedly connected to the base 3120B. The holding portion 3110B includes two posts 3111B. The base 3120B includes two grooves 3121B, a connecting portion 3122B, three supporting portions 3123B and a groove 3124B.

In some embodiments, the two posts 3111B of the holding portion 3110B extend along a direction toward the base 3120B. The posts 3111B of the holding portion 3110B pass through the groove 3121B of the base 3120B to be connected to the base 3120B. Details of the connecting portion 3122B, the supporting portion 3123B and the groove 3124B of the base 3120B are described in detail later.

In some embodiments, the movable portion 3200B includes an opening 3201B. The opening 3201B holds the adjustment assembly 1000B (FIG. 7). The movable portion 3200B may be driven by the driving assembly 3300B to rotate around the central axis C relative to the fixed portion 3100B. The movable portion 3200B is supported by the supporting component 3400B, and may rotate relative to the fixed portion 3100B.

In some embodiments, the light source module (not shown) may be disposed on the base 3120B at a position that is not aligned with the central axis C, so as to correspond to the switching portion of the adjustment assembly 1000B (FIG. 7). For example, corresponding to the first switching portion 1010B or the second switching portion 1020B or the third switching portion 1030B shown in FIG. 7 according to the position to which the movable portion 3200B is driven.

The blocking component (not shown) held by the holding portion 3110B may block the light sources that are not in the aforementioned corresponding positions. For example, when the first switching portion 1010B shown in FIG. 7 corresponds to the light source emitted by the light source module (not shown), the blocking component (not shown) held by the holding portion 3110B blocks the light source from entering the second switching portion 1020B (FIG. 7) and the third switching portion 1030B (FIG. 7).

In the embodiments shown in FIG. 7 to FIG. 8, the switching assembly 3000B uses a light source module (not shown) similar to the light source module 2000A shown in FIG. 5. The light source module sequentially switches the light (for example, the first light, the second light and the third light, etc.) it emitted, thereby obtaining a color image formed on the target component (not shown).

Please continue to refer to FIG. 8, in some embodiments, the driving assembly 3300B includes a set of magnetic components 3310B, a set of coil components 3320B, a circuit member 3330B, and a strengthening structure 3340B. The set of magnetic components 3310B is disposed on the movable portion 3200B. The set of magnetic components 3310B is composed of a plurality of magnetic components, and the plurality of magnetic components forms a shape of a ring. Any two adjacent magnetic components are arranged in opposite magnetic pole directions.

In some embodiments, the coil component 3320B includes a plate 3321B and a plurality of coils 3322B. The plurality of coils 3322B are embedded in the plate 3321B. The magnetic component 3310B corresponds to the coil component 3320B.

That is to say, when a driving signal is applied to the driving assembly 3300B (for example, when a current is applied by an external power supply), a magnetic force is generated between the magnetic component 3310B and the coil component 3320B. Then, the magnetic component 3310B may be driven to rotate around the central axis C relative to the fixed portion 3100B.

The coil component 3320B is electrically connected to the circuit member 3330B. The strengthening structure 3340B is made of magnetically permeable material. The coil component 3320B, the circuit member 3330B and the strengthening structure 3340B all have a ring structure. The coil component 3320B, the circuit member 3330B and the strengthening structure 3340B are stacked together in sequence. The stacked coil component 3320B, the circuit member 3330B, and the strengthening structure 3340B are disposed on the connecting portion 3122B of the base 3120B.

In some embodiments, supporting component 3400B may be balls. The supporting component 3400B supports the movement of the movable portion 3200B relative to the fixed portion 3100B. The supporting component 3400B is disposed in the support portion 3123B of the base 3120B, and contacts the movable portion 3200B.

In some embodiments, the control component 3500B may be an integrated circuit. The aforementioned strengthening structure 3340B includes an opening 3341B. The control component 3500B is disposed in the opening 3341B of the strengthening structure 3340B, and is electrically connected to the circuit member 3330B of the driving assembly 3300B.

In some embodiments, the position sensing component 3600B is disposed in the groove 3124B of base 3120B. The position sensing component 3600B is electrically connected to the control component 3500B and the circuit member 3330B. The position sensing component 3600B is configured to sense the relative positional relationship between the movable portion 3200B and the fixed portion 3100B, so that the control component 3500B may adjust the position between the two by the driving assembly 3300B.

The embodiments shown in FIG. 7 to FIG. 8 provide an adjustment assembly 1000B for forming an image and a switching assembly 3000B for switching the adjustment assembly 1000B. In this embodiment, the adjustment component 1000B is assembled on the switching assembly 3000B to achieve the desired optical effect.

To sum up, the present invention provides an optical system including an adjustment assembly with microstructures. In some embodiments, the adjustment assembly is formed by stacking multiple layers of adjustment components, wherein each layer of adjustment components corresponds to light of different wavelengths, so as to achieve desired optical effects (e.g., better color display effect). In some implementations, the different adjustment components of the adjustment assembly are disposed on different portions of the same plane, and assembled on the switching assembly for the switching the adjustment assembly to correspond to light of different wavelengths, so as to achieve the desired optical effect, for example, better color display effect. It should be noted that the present application includes multiple embodiments, and those skilled in the art should understand that the different embodiments disclosed in this application may be combined in any reasonable manner after reading the present disclosure.

The ordinal numbers in this specification and the scope of the patent application, such as "first", "second", etc., do not have a sequential relationship between each other. They are only used to distinguish between different components that have the same name.

While the embodiments and advantages of the present invention have been disclosed above, it should be understood that those skilled in the art may make modifications, alternations, and improvements without departing from the spirit and scope of the invention. Furthermore, the scope of the present invention is not limited to the specific embodiments of processes, machines, manufacturing, material compositions, devices, methods, and steps described in this specification. Those skilled in the art can understand from the disclosure of the present invention the processes, machines, manufacturing, material compositions, devices, methods, and steps developed currently or in the future, as long as they can achieve substantially the same function or result as described in the embodiments disclosed herein. Therefore, the scope of the present invention includes the above-mentioned processes, machines, manufacturing, material compositions, devices, methods, and steps. In addition, each claim in the application constitutes a separate embodiment, and the scope of the present invention also includes the combination of various claims and embodiments.

The above-described embodiments provide sufficient details for those skilled in the art to implement the disclosed device. However, it should be understood that minor modifications and improvements may be made without departing from the spirit and scope of the present invention. Therefore, the scope of the present invention shall be determined by the claims appended hereto.

What is claimed is:

1. An optical system, comprising:

a light source module emitting a light source, wherein the light source comprises a first light and a second light; and an adjustment assembly corresponding to the first light and the second light;

wherein the wavelength of the first light and the wavelength of the second light are different;

wherein the adjustment assembly comprises:

a first surface and a second surface parallel to each other, wherein the first surface and the second surface both have a planar structure, and the first surface and the second surface are on different planes;

a first adjustment component disposed on the first surface corresponding to the first light, and the first adjustment component has a periodic microstructure; and a second adjustment component disposed on the second surface corresponding to the second light, and the second adjustment component has a periodic microstructure;

wherein a maximum change in an angle of the first light after passing through the first adjustment component is greater than a maximum change in an angle of the second light after passing through the first adjustment component.

2. The optical system as claimed in claim 1, wherein the change in the first light after passing through the first adjustment component is greater than the change in the second light after passing through the first adjustment component.

3. The optical system as claimed in claim 1, wherein the change in the first light after passing through the second adjustment component is smaller than the change in the second light after passing through the second adjustment component.

4. The optical system as claimed in claim 1, wherein a maximum change in an angle of the first light after passing through the second adjustment component is smaller than a maximum change in an angle of the second light after passing through the second adjustment component.

5. The optical system as claimed in claim 1, wherein the adjustment assembly further comprises a first substrate, the first surface and the second surface are on both sides of the first substrate, and the first surface and the second surface are facing different directions.

6. The optical system as claimed in claim 5, wherein the light source further comprises a third light, and the adjustment assembly further comprises a third surface and a third adjustment component, wherein the third adjustment component has a periodic microstructure, and the third adjustment component is disposed on the third surface.

7. The optical system as claimed in claim 6, wherein the change in the third light after passing through the third adjustment component is greater than the change in the second light after passing through the third adjustment component.

8. The optical system as claimed in claim 6, wherein a maximum change in an angle of the third light after passing through the third adjustment component is greater than a maximum change in an angle of the second light after passing through the third adjustment component.

9. The optical system as claimed in claim 6, wherein the first surface and the third surface face the same direction.

10. The optical system as claimed in claim 6, wherein the adjustment assembly further comprises a second substrate, and the third surface is on the second substrate.

11. The optical system as claimed in claim 1, wherein the adjustment assembly comprises a first adjustment component, a second adjustment component, a third adjustment component, a first interposer, a second interposer and a third interposer, the first adjustment component is disposed on the first interposer, the second adjustment component is disposed on the second interposer, and the third adjustment component is disposed on the third interposer.

12. The optical system as claimed in claim 11, wherein the adjustment assembly further comprises a first protective layer, a second protective layer, a third protective layer, wherein the first protective layer is over the first interposer, the second protective layer is over the second interposer, and the third protective layer is over the third interposer, so that the adjustment component is formed in a plurality of processes consecutively.

13. The optical system as claimed in claim 1, further comprising:

a target component;

a switching assembly holding the adjustment assembly, wherein the switching assembly switches the adjustment assembly to a first position or a second position; and an optical path diverting component, changing the deflection angle of the light source after the light source enters the optical path diverting component;

wherein the light source sequentially passes through the adjustment assembly and the optical path diverting component, and forms an image on the target component.

14. The optical system as claimed in claim 13, wherein the switching assembly drives the adjustment assembly to the first position when the light source module emits the first light.

15. The optical system as claimed in claim 13, wherein the switching assembly drives the adjustment component to the second position when the light source module emits the second light.

16. The optical system as claimed in claim 13, wherein the adjustment assembly comprises a first switching surface and a second switching surface, wherein the first switching surface and the second switching surface are coplanar.

17. The optical system as claimed in claim 16, wherein the adjustment assembly further comprises a first adjustment component and a second adjustment component, the first adjustment component is disposed on the first switching surface, and the second adjustment component is disposed on the second switching surface.

18. The optical system as claimed in claim 17, wherein the first adjustment component corresponds to the light source when the adjustment assembly is in the first position, and the second adjustment component corresponds to the light source when the adjustment assembly is in the second position.

* * * * *